(12) United States Patent
Barton et al.

(10) Patent No.: US 12,297,358 B2
(45) Date of Patent: May 13, 2025

(54) HYDROPHOBICALLY MODIFIED PIGMENT COMPOSITION

(71) Applicants: THE REGENTS OF THE UNIVERSITY OF CALIFORNIA, Oakland, CA (US); Dow Global Technologies LLC, Midland, MI (US); Rohm and Haas Company, Collegeville, PA (US)

(72) Inventors: David G. Barton, Midland, MI (US); James C. Bohling, Collegeville, PA (US); Juan F. Callejas, Collegeville, PA (US); Amrita Chakravarty, Berkeley, CA (US); Alexander Katz, Richmond, CA (US); Manish K. Mishra, Berkeley, CA (US); Clayton J. Radke, El Cerrito, CA (US); Antony K. Van Dyk, Blue Bell, PA (US)

(73) Assignees: The Regents of the University of California, Oakland, CA (US); Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 630 days.

(21) Appl. No.: 17/765,616

(22) PCT Filed: Oct. 1, 2020

(86) PCT No.: PCT/US2020/053685
§ 371 (c)(1),
(2) Date: Mar. 31, 2022

(87) PCT Pub. No.: WO2021/067537
PCT Pub. Date: Apr. 8, 2021

(65) Prior Publication Data
US 2022/0363908 A1 Nov. 17, 2022

Related U.S. Application Data

(60) Provisional application No. 62/909,344, filed on Oct. 2, 2019.

(51) Int. Cl.
| | | |
|---|---|---|
| C09C 1/36 | (2006.01) | |
| C08K 9/06 | (2006.01) | |
| C09C 3/12 | (2006.01) | |
| C09D 5/02 | (2006.01) | |
| C09D 7/43 | (2018.01) | |
| C09D 7/62 | (2018.01) | |
| C09D 17/00 | (2006.01) | |
| C09D 133/04 | (2006.01) | |

(52) U.S. Cl.
CPC .............. *C09C 1/3684* (2013.01); *C09C 3/12* (2013.01); *C09D 5/022* (2013.01); *C09D 7/43* (2018.01); *C09D 7/62* (2018.01); *C09D 17/001* (2013.01); *C09D 17/008* (2013.01); *C09D 133/04* (2013.01); *C08K 9/06* (2013.01)

(58) Field of Classification Search
None
See application file for complete search history.

(56) References Cited

U.S. PATENT DOCUMENTS

| | | |
|---|---|---|
| 7,507,480 B2 | 3/2009 | Sugama |
| 8,852,555 B2 | 10/2014 | Handa |
| 2005/0154086 A1 | 7/2005 | Yoneyama |
| 2016/0244615 A1 | 8/2016 | Wuehr |
| 2017/0022384 A1 | 1/2017 | Jankolovits |
| 2018/0355182 A1 | 12/2018 | Ippolito |

*Primary Examiner* — Robert T Butcher
(74) *Attorney, Agent, or Firm* — Riverside Law LLP

(57) ABSTRACT

The present invention is a composition comprising an aqueous dispersion of metal oxide pigment particles coated with an organosilane polymer comprising structural units of an alkyltrihydroxysilane or a salt thereof, a dialkyldihydroxysilane or a salt thereof, and an ancillary alkylsilane triol. The composition of the present invention provides hydrophobicity to pigment particles, thereby imparting water resistance, and allows for high loadings of pigment in water without increased viscosity. The dispersion is further useful for providing stain and corrosion resistance in coatings arising from paints.

8 Claims, No Drawings

HYDROPHOBICALLY MODIFIED PIGMENT COMPOSITION

CROSS-REFERENCE TO RELATED APPLICATIONS

The present application is a 35 U.S.C. § 371 national phase application from, and claiming priority to, International Application PCT/US2020/053685, filed Oct. 1, 2020, which claims priority to U.S. Provisional Application No. 62/909,344, filed Oct. 2, 2019, all of which applications are incorporated herein by reference in their entireties.

BACKGROUND OF THE INVENTION

The present invention relates to a composition comprising hydrophobically modified pigment particles.

Performance of water-borne paint formulations is influenced in part by the surface chemistry of the inorganic pigment used to opacify the paint. Pigments such as the widely used $TiO_2$ tend to be hydrophilic in their native state and therefore not particularly effective as a barrier to penetration of water, ions, and water-soluble colorants at the pigment-binder interface. For this reason, it would be advantageous to modify the surface of inorganic pigment particles to provide coatings with improved resistance to stains and corrosion.

The dispersion stability of pigment particles in the paint formulation affects the hiding efficiency of the consequent film. Pigment aggregates provide less hiding than isolated primary particles; therefore, it would be further advantageous to modify the surface of pigment particles to minimize pigment aggregation in films, thereby reducing the amount of pigment needed in the formulation.

It is known in the art to modify the surface of pigment particles with hydrophobic groups. For example, US 2017/0022384 A1 discloses an aqueous dispersion of inorganic pigment particles modified with polysiloxane or silyl groups. In theory, hydrophobically modified pigment particles would be expected to improve barrier properties, thereby improving hiding. Nevertheless, in practice, formulators continue to experience difficulty in dispersing hydrophobically modified pigment particles in water because of their poor wettability and the poor stability of the aqueous dispersions of the hydrophobically modified pigment particles. The use of dispersing agents (dispersants and surfactants) can address these issues in part, but dispersing agents present problems of their own, including limiting film formation, increasing water sensitivity, increasing permeability to ions and polar compounds, disrupting adhesion to certain substrates, and promoting exudation (oozing) of non-film forming additives such as surfactants, defoamers, coalescents, and dispersants to the surface of the coating.

It would therefore be advantageous to increase pigment volume concentrations of aqueous dispersions of hydrophobically modified pigments to above 37 volume percent without concomitant increase in viscosity, and further be advantageous to be able to disperse pigment in while substantially reducing, or even eliminating the use of ancillary dispersing agents.

SUMMARY OF THE INVENTION

The present invention addresses a need in the art by providing a composition comprising an aqueous dispersion of metal oxide pigment particles coated with an organosilane polymer comprising structural units of a) an alkyltrihydroxysilane or a salt thereof at a concentration in the range of from 50 to 98.9 mole percent; b) a dialkyldihydroxysilane or a salt thereof at a concentration in the range of from 1 to 49.9 mole percent; and c) an ancillary alkysilanetriol at a concentration in the range of from 0.1 to 4 mole percent; wherein all concentrations are based on the total structural units of the alkyltrihydroxysilane monomer, the dialkyldihydroxysilane monomer, and the ancillary alkylsilanetriol; wherein the ancillary alkylsilanetriol is 3-aminopropylsilanetriol or a salt thereof or 3,3,3-trifluoropropylsilanetriol or a salt thereof; and wherein the aqueous dispersion has a pH in the range of from 7.5 to 12. The present invention provides an aqueous dispersion of hydrophobically modified pigment particles at a high solids content at an acceptably low viscosity. Such dispersions form coatings that are remarkably water-resistant and exhibit additional benefits such as resistance to corrosion and stain.

DETAILED DESCRIPTION OF THE INVENTION

The present invention is a composition comprising an aqueous dispersion of metal oxide pigment particles coated with an organosilane polymer comprising structural units of a) an alkyltrihydroxysilane or a salt thereof at a concentration in the range of from 50 to 98.9 mole percent; b) a dialkyldihydroxysilane or a salt thereof at a concentration in the range of from 1 to 49.9 mole percent; and c) an ancillary alkylsilanetriol at a concentration in the range of from 0.1 to 4 mole percent, wherein all concentrations are based on the total structural units of the alkyltrihydroxysilane monomer, the dialkyldihydroxysilane monomer, and the ancillary alkylsilanetriol; wherein the ancillary alkylsilanetriol is 3-aminopropylsilanetriol or a salt thereof or 3,3,3-trifluoropropylsilanetriol or a salt thereof; and wherein the aqueous dispersion has a pH in the range of from 7.5 to 12.

As used herein, a structural unit of an alkyltrihydroxysilane refers to the following fragment:

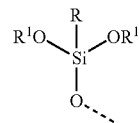

where R is an alkyl group, preferably a $C_1$-$C_{18}$-alkyl group, more preferably a $C_1$-$C_4$-alkyl group and most preferably methyl; and each $R^1$ is independently H, a bond to the pigment particle; M, or another Si atom; wherein M is an alkali metal or ammonium counterion, preferably a lithium, a sodium, or a potassium counterion; and the dotted line represents the point of attachment of the oxygen atom to the pigment particle.

As used herein, a structural unit of a dialkyltrihydroxysilane refers to the following fragment:

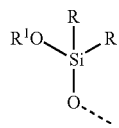

where each R is independently an alkyl group, preferably a $C_1$-$C_{18}$-alkyl group, more preferably a $C_1$-$C_4$-alkyl group and most preferably methyl; and each $R^1$ is independently H, a bond to the pigment particle; M, or another Si atom; wherein M is an alkali metal or ammonium counterion, preferably a lithium, a sodium, or a potassium counterion; and the dotted line represents the point of attachment of the oxygen atom to the pigment particle.

Preferably, the organosilane polymer comprises from 60, more preferably from 65, and most preferably from 68 mole percent, to preferably 90, more preferably to 85, and most preferably to 80 mole percent structural units of the alkyltrihydroxysilane or a salt thereof. The organosilane polymer further preferably comprises from 10, more preferably from 15 and most preferably from 20 mole percent, to 40, and more preferably to 30 mole percent structural units of the dialkydihydroxysilane or salt thereof; and from 0.2, more preferably from 0.5 mole percent to 3.5, more preferably to 3.2 mole percent structural units of the ancillary alkylsilanetriol. Preferably, at least 90, more preferably at least 95 weight percent of the organosilane polymer comprises structural units of the alkyltrihydroxysilane and the dialklydihydroxysilane. In one embodiment of the present invention, 100 weight percent of the organosilane polymer comprises structural units of the alkyltrihydroxysilane or a salt thereof, the dialklydihydroxysilane or a salt thereof, and the ancillary alkylsilanetriol.

The aqueous dispersion of hydrophobically modified metal oxide pigment particles may be prepared by a) contacting metal oxide pigment particles, or an aqueous dispersion of metal oxide pigment particles, with a base to form basified metal oxide pigment particles or an aqueous dispersion of basified metal oxide particles, then b) contacting the basified metal oxide particles with the organosilane in the presence of water and at a pH in the range of from 7.5, preferably from 8.5, more preferably from 9, and most preferably from 9.2 to 12, preferably to 11, more preferably to 10, and most preferably to 9.8, to form the aqueous dispersion of hydrophobically modified pigment particles. In this aspect, it is preferred in the first step that an aqueous dispersion of metal oxide pigment particles are contacted with a base to form an aqueous dispersion of basified metal oxide particles. The alkyltrihydroxysilane, the dialkyldihydroxysilane, and the ancillary alkylsilanetriol are all advantageously converted to their corresponding salts in aqueous solution, prior to contacting with the aqueous dispersion of basified pigment particles. Preferably, the alkyltrihydroxysilane, the dialkyldihydroxysilane, and the ancillary alkylsilanetriol, more preferably methyltrihydroxysilane, dimethyldihydroxysilane, and the ancillary alkylsilanetriol are contacted with the pigment particles as an aqueous mixture adjusted to a pH of ≥12. In another embodiment, the pigment particles may be contacted with the organosilane without base pre-treatment.

The most preferred alkyltrihydroxysilane, methyltrihydroxysilane, can be obtained commercially or prepared in situ by aqueous alkali metal hydroxide hydrolysis of polymethylhydrosiloxane (PMHS) at a pH of ≥12. It has been found to be particularly advantageous for storage stability to maintain an aqueous solution of the methyltrihydroxysilane at a high pH until contact with the pigment particles to minimize self-condensation of the methyltrihydroxysilane. The most preferred dialkyldihydroxysilane, dimethyldihydroxysilane, is advantageously prepared by hydrolysis of dimethoxydimethylsilane with a strong base such as KOH.

It is further advantageous to maintain a pH in the range of 9 to 10, more preferably from 9.2 to 9.8 during the organosilane addition step through separate and concomitant addition of a strong acid to the pigment particles or basified pigment particles.

As used herein, metal oxide particles include both metal oxide and metalloid oxide particles, examples of which include oxides and carbonates of titanium, aluminum, silicon, iron, calcium, magnesium, zirconium, or zinc, and mixtures thereof. Examples of preferred pigment particles include $CaCO_3$, $Al_2O_3$, $SiO_2$, and $TiO_2$ pigment particles. $TiO_2$ pigment particles include rutile and anatase $TiO_2$, as well as $TiO_2$ surface treated with a variety of metal oxides and hydroxides including alumina, silica, and zirconia.

The average particle size of the metal oxide pigment particles is preferably from 10 nm, more preferably from 20 nm, more preferably from 50 nm, more preferably from 100 nm, more preferably from 200 nm, and most preferably from 240 nm, to preferably 5 µm, more preferably to 1 µm, more preferably to 500 nm, more preferably to 400 nm, and most preferably to 300 nm.

Average particle size of the metal oxide pigment particles is defined by the average particle size determined by dynamic light scattering using a Malvern Zetasizer Nano Particle Size Analyzer.

The base used to pre-treat pigment particles—where it is desirable to pre-treat the particles—include amines such as trimethylamine, triethylamine, dimethylamine, diethylamine, 2-amino-2-methyl-1-propanol, piperidine, and piperazine; amino acids such as arginine, histidine, and lysine; iminoalkydiamines such as guanidine; purines such adenine; pyrimidines such as cytosine; ammonium hydroxide; quaternary tetra-$C_1$-$C_{12}$-alkyl ammonium hydroxides such as tetramethylammonium hydroxide, tetraethylammonium hydroxide, and tetrabutylammonium hydroxide; and alkali metal hydroxides such as LiOH, NaOH, and KOH. The base is preferably used stoichiometrically or in stoichiometric excess with respect to base-reactive sites of the pigment particles. Such reactive sites include acidic OH groups and Lewis acid metal cations such as $Al^{III}$, $Ti^{IV}$, $Zr^{IV}$, $Zn^{IV}$, $Ca^{II}$, and $Mg^{II}$.

The alkyltrihydroxysilane, the dialkyldihydroxysilane, and the ancillary alkylsilanetriol, preferably the salts of these organosilanes, are advantageously added to the pigment particles in a sufficient amount to convert the pigment particles to hydrophobically modified pigment particles. The term "hydrophobically modified" means that the modified pigment particles have <25% by weight water uptake relative to the unmodified dry pigment particles at 90% relative humidity as measured using a DVS Advantage ET Analyzer (Surface Measurement Systems).

The organosilanes bind to the pigment particles to form the hydrophobic organosilane polymer coating comprising structural units of the alkyltrihydroxysilane, the dialkyldihydroxysilane, and the ancillary alkylsilane triol or salts of thereof. Preferably, for a pigment particle having a particle size in the range of from 250 nm to 350 nm, the wt. % Si in the organosilane polymer and arising from addition of the alkyltrihydroxylsilane, the dialkyldihydroxysilane, and the ancillary alkylsilanetriol with respect to the pigment particles is preferably in the range of from 0.1, more preferably from 0.5, and most preferably from 1 wt. %, to preferably 4, and more preferably to 3 wt. %. Alternatively, the concentration of Si atoms in the organosilane polymer and arising from addition of the alkyltrihydroxylsilane, the dialkyldihydroxysilane, and the alkylsilanetriol to the basified pigment particles, is preferably in the range of from 4, more preferably from 10, and most preferably from 20 Si atoms/nm² of the external pigment surface area to preferably 120, more preferably to 100, more preferably to 80, and most preferably to 60 Si atoms/nm² of external pigment surface area. As used herein, external pigment surface area refers to the geometrical external surface area of a sphere having the same diameter as a pigment particle, as measured by dynamic light scattering, as performed using Malvern Zetasizer Nano Particle Size Analyzer. The extent of alkyltrihydroxylsilane, dialkyldihydroxysilane, and ancillary alkylsilanetriol incorporation onto the pigment particles is determined by digestion followed by Si analysis by inductively coupled plasma-atomic emission spectroscopy (ICP-AES).

It has surprisingly been discovered that an aqueous dispersion of self-dispersing hydrophobically modified pigment particles with a small amount or no added dispersing agent, which can be a dispersant or a surfactant, can be prepared at a volume solids fraction of 0.37 to 0.5 (corresponding to ~70 to 80 wt. % solids for Ti-Pure R706 $TiO_2$) without any significant increase in slurry viscosity as compared with the unmodified slurry of pigment with a dispersing agent at the same concentration. Thus, for a 70 weight percent solids (0.37 volume solids fraction) aqueous slurry comprising the hydrophobically-modified pigment particles, shear stresses are preferably not greater than 0.03 Pa, at a shear rate at $0.1\ s^{-1}$ without ancillary dispersing agents.

The viscosities for the same slurry are preferably not greater than 0.4 Pa·s at a shear rate of $0.1\ s^{-1}$, and preferably not greater than to 0.03 Pa·s at a shear rate of $100\ s^{-1}$ without ancillary dispersants. These viscosities are ~35- to 450-fold higher than that of water, and are easily pourable liquid-like slurries. The presence of a small amount of a dispersing agent has been found to further improve shear stress and viscosity but the rheology properties are quite acceptable even in the absence of the dispersing agent.

For a 75 weight percent solids (0.43 volume solids fraction) aqueous slurry comprising the hydrophobically-modified pigment particles, shear stresses are preferably not greater than 0.22 Pa at a shear rate of $0.1\ s^{-1}$. The viscosities for the same slurry in the absence of an ancillary dispersing agent are preferably not greater than 2.2 Pa·s at a shear rate of $0.1\ s^{-1}$ and preferably not greater than to 0.035 Pa·s at a shear rate of 100 In the presence of as little as 0.08 wt. % with respect to pigment mass of a surfactant such as TRITON™ X-100 Surfactant (A Trademark of The Dow Chemical Company or its Affiliates), a substantial decrease in shear stress to 0.06 Pa at a shear rate of $0.1\ s^{-1}$ has been observed. Also, in the presence of this small amount of the surfactant, the viscosity substantially decreased to 0.6 Pa·s at a shear rate of $0.1\ s^{-1}$, and not greater than 0.035 Pa·s at a shear rate of 100 These viscosities are ~40- to 2500-fold higher than that of water and, again, are easily pourable liquid-like slurries.

For an 80-weight percent solid (0.50 volume solids fraction) an aqueous slurry comprising the hydrophobically-modified pigment particles, shear stresses are preferably not greater than 2.2 Pa at a shear rate of $0.1\ s^{-1}$. The viscosities for the same slurry are preferably not greater than 22 Pa·s at a shear rate of $0.1\ s^{-1}$ and preferably not greater than to 0.2 Pa·s at a shear rate of $100\ s^{-1}$. In the presence of a small amount of the dispersing agent, both the viscosity and the shear stress were not greater than 20 Pa·s and 2 Pa, respectively, at a shear rate of $0.1\ s^{-1}$. These viscosities are ~225- to 25,000-fold higher than that of water.

It has been discovered that the aqueous dispersions of the hydrophobically modified pigment particles can be achieved without an ancillary dispersing agent as required in the teachings of US 2017/0022384 A1. Accordingly, in another aspect of the invention, the composition of the present invention comprises a substantial absence of a dispersing agent, that is, less than 0.09, preferably less than 0.05, more preferably less than 0.01, and most preferably 0 weight percent of a dispersing agent, based on the weight of the pigment. The substantial absence of dispersing agent is particularly advantageous in coating formulations since dispersing agents, particularly anionic polymeric dispersants, limit film formation, promote corrosion, and increase water sensitivity of coatings and promote undesirable exudation of non-solids (e.g., salts and polyelectrolytes) to the interfaces of the coatings.

The preparation of the aqueous dispersion of the hydrophobically modified pigment particles is preferably carried out in the absence of organic solvents. (Although some small amount of a $C_1$-$C_4$-alcohol can, in principal, be generated in the process, these byproducts do not constitute organic solvents.) As such, the process of the present invention is advantaged over previously described pigment modification processes that require the use organic solvents.

The composition of the present invention is suitable for coatings formulations, which includes a latex, and preferably one or more additional materials including defoamers, surfactants, thickeners, extenders, coalescents, biocides, and colorants. The composition provides coating compositions with improved water-resistance, as well as stain-resistance or corrosion-resistance or both, over pigment particles that are not hydrophobically modified, as demonstrated by the following examples.

EXAMPLES

Calculation of Amine Functionalization of Pigment Particles

The extent of amine functionalization was determined by acid-base back titration as described in ACS Catalysis 2014, 302-310.

Intermediate Example 1—Preparation of Methyltrihydroxysilane from Polymethylhydrosiloxane To a 3-neck plastic spinner flask was added 4 M KOH solution (244 mL). The solution was purged with $N_2$ for 15 min, after which time polymethylhydrosiloxane (PMHS, from Aldrich Cat. No. 176206, $M_n$=1700-3200 g/mol, CAS No. 63148-57-2, 36 mL) was added over 25 s, followed by further degassing. The resulting degassed solution was stirred at 600 rpm for 6 h under $N_2$. FTIR spectroscopic analysis confirmed conversion of all of the PMHS to methyltrihydroxysilane (MTHS). The solution was stored in a tightly capped container to prevent exposure to atmospheric carbon dioxide. The concentration of MTHS in water was 0.234 g/mL.

Intermediate Example 2—Preparation of Dimethyldihydroxysilane Monopotassium Salt A Teflon round bottom flask capped with a rubber septum was placed in an ice bath and purged with $N_2$ for 10 min. Dimethyldimethoxysilane (11.6 mL, 95% v/v, density=0.88 g/mL) was then added to the flask through the septum by way of a needle and syringe. 4M KOH solution (20.2 mL, 0.08 moles of KOH) was added with stirring to the flask at a rate of 20 µL/5 s for 2 min, then at a rate 2.5 mL/min for the remainder of the addition. After completion of addition of KOH, the solution was stirred for an additional 10 min, followed by rotary evaporation removal of water and liberated methanol at 60° C. for 30 min, then at 70° C. for 15 min. The product (10.20 g) was obtained and identified by $^1H$ and $^{29}$Si NMR spectroscopy as the monopotassium salt of dimethyldihydroxysilane (K-DMDS).

Intermediate Example 3—Preparation of a 74:25:1 Mixture of Methyltrihydroxysilane:Dimethyldihydroxysilane: 3-Aminopropylsilanetriol An aqueous solution of K-DMDS as prepared in Intermediate Example 2 (0.20 g dissolved in 0.61 mL water), a portion of the MTHS solution as prepared in Intermediate Example 1 (1.81 mL), and aminopropylsilanetriol (APST, 0.033 mL (23.5% in water)) were admixed to form a 74:25:1 mole:mole:mole mixture of MTHS:K-DMDS:APST. The mixture was vortexed to obtain a transparent solution (2.6 mL), which was further used for hydrophobic modification of pigment. The pH of the resulting mixture was ~14.

Intermediate Example 4—Preparation of Acrylic Binder

To a 4 neck reaction flask fitted with condenser, stirrer, and thermocouple was added deionized water (700 g). The contents of the flask were heated to 88° C. under $N_2$. In a second vessel, a monomer emulsion (ME-1) was prepared by mixing deionized water (500 g), sodium lauryl sulfate solution (SLS, 24.4 g, 28% active in water), butyl acrylate (492 g), methyl methacrylate (502 g), methacrylic acid (10.0 g), and n-dodecylmercaptan (2.5 g). SLS (7.0 g, 28% active in water) and sodium carbonate solution (35 g, 14.3% active in water) were added to the flask followed by a DI water rinse (40 g). A portion of ME-1 (40.7 g) was then added to the flask followed by ammonium persulfate (APS, 4.0 g dissolved in 30 g DI water) followed by a DI water rinse (35 g). After a small exotherm was observed, the remainder of ME-1 was metered in with the concurrent addition of a solution of APS (1.0 g dissolved in 60 g DI water), followed by DI water rinses (35 g) while maintaining a reactor temperature of 87° C. over 120 min. After feed completion, the reaction flask was maintained at 87° C. for an additional 1 h. A redox pair was then added to reduce any residual monomers and the batch was then cooled and ammonium hydroxide (28% active) was added to adjust the pH to 8.5. The resulting dispersion had a solids content of 40.2 weight % and a z-average particle diameter of 98 nm.

Example 1—Hydrophobic Modification of TEA-Modified $TiO_2$ with a 74:25:1 Mixture of Methyltrihydroxysilane:Dimethyldihydroxysilane:3-Aminopropylsilanetriol A. Pre-Treatment of $TiO_2$ with Triethylamine Ti—R706 $TiO_2$ powder (250 g), water (500 mL), TAMOL™ 1124 Dispersant (2.5 mL, A Trademark of The Dow Chemical Company or its Affiliates), and triethylamine (TEA, 2.5 mL) were added to 1-L round bottom flask to form a slurry, which was stirred with a motorized overhead mixer at 1950 rpm for 20 h. Excess amine was removed by transferring the slurry into centrifuge vessels in four equal parts and centrifuging at 14,000 rpm for 3 min. The solid mass collected after centrifugation was broken into small pieces with a spatula, followed by addition of water (250 mL) to each of the four parts. Each sample was subjected to vortex mixing for 5 min followed by ultrasonication for 5 min. The samples were centrifuged again at 14,000 rpm for 3 min resulting in wet pastes with a solids content of 83.8 wt. % $TiO_2$. The entire water-wash process was repeated four more times for each sample to create a slurry having an 83.8 wt. % solids that was free of any amine or ammonia odor. The amine not recovered by the extensive water washing step was considered to be bound to the surface of particles; the resulting particles were amine-functionalized $TiO_2$ particles.

The extent of amine functionalization of the $TiO_2$ particles was measured by acid-base back titration using 0.01 M HCl and 0.01 M NaOH, as described in ACS Catalysis 2014, 4, 302. It was found that 34 µmol/g of basic sites were available on the surface of the TEA treated $TiO_2$ particles (TEA-R706), which corresponds to a surface coverage of bound amine of 2 TEA molecules/$nm^2$ of total pigment surface area.

The capillary rise test was performed to assess the hydrophobicity of TEA-R706. The capillary rise test was carried out as follows: 2.5 mM bromothymol dye solution adjusted to pH 8 in aqueous HEPES buffer was used. A 1.5-mm diameter capillary tube blocked on one end with cotton was filled to a height of 4 cm with dried pigment powder. The capillary was then dipped in dye solution for 4 h and the rise of dye was measured with a ruler. The contact angle was subsequently calculated from the height of dye rise, using Washburn's equation. TEA-R706 exhibited a capillary rise of aqueous bromothymol blue dye of 3.2 cm, indicating that it was not a hydrophobic material.

B. Hydrophobic Modification of TEA-R706 with a 74:25:1 Mixture of Methyltrihydroxysilane, Dimethyldihydroxysilane, and 3-Aminopropylsilanetriol TEA-R706 wet paste (13.6 g), TAMOL™ 1124 Dispersant (68 µL), two 10-mm $ZrO_2$ beads, and water (0.2 mL) were placed in a plastic container and mixed with a Flacktek high-speed mixer at 1700 rpm for 2 min to form a slurry. Additional water (0.845 mL) was added to the slurry and further high shear mixing was carried out at 3500 rpm for 3 min in the absence of $ZrO_2$ beads to form a slurry with a pigment solids content of 77.5 wt. %.

An aqueous mixture of the MTHS, the K-DMDS, and the APST (2.6 mL), was added to the slurry with concomitant addition of 2.0 M HCl (3.2 mL), to adjust the pH of the slurry to 9.5. The slurry was mixed at 3500 rpm for 3 min, after which time water (2.5 mL) was added, followed by vortexing for 4 h. The slurry was then washed with water (200 mL) and centrifuged at 14000 rpm for 5 min. The solid mass collected after centrifugation was broken down with a spatula and washed with water (200 mL) before being centrifuged again. This procedure was repeated two more times, and the resulting product was obtained as a wet paste with a $TiO_2$ solids content of 80 wt. %.

The product was dried for 24 h and its hydrophobicity was confirmed as follows: Dried powder (100 mg) was placed into a beaker filled with DI water (200 mL) and was observed for 2 h for evidence of settling. After 2 h, the powder was completely floatable on water with no observed settling of the powder, which provided strong evidence of hydrophobicity. A capillary rise test confirmed the hydrophobic nature of the material: no rise of an aqueous solution of bromothymol dye at pH 8 before and after the high shear stress test of the hydrophobic material at pH 8.7 was observed.

Example 2—Hydrophobic Modification of TEA-Modified $TiO_2$ with a 72:25:3 Mixture of Methyltrihydroxysilane:Dimethyldihydroxysilane:3-Aminopropylsilanetriol The procedure was carried out substantially as described in Example 1 except that the admixture of MTHS, K-DMDS, and APST were prepared by combining the aqueous solution of K-DMDS (0.20 g dissolved in 0.61 mL water), a portion of the MTHS solution as prepared in Intermediate Example 1 (1.76 mL), and aminopropylsilanetriol (APST, 0.10 mL (23.5% in water)) were admixed to form a 72:25:3 mole:mole:mole mixture of MTHS:K-DMDS:APST. The hydrophobicity of the resultant modified $TiO_2$ was confirmed as described hereinabove.

Corrosion Studies

A paint formulation was prepared by combining the acrylic binder of Intermediate Example 2 (12.79 g, 40.2 weight percent solids); dilute saline solution (120 mg NaCl dissolved in 1.77 g DI water); Example 1 or 2 hydrophobically modified pigment (4.64 g, 75 wt. % pigment); NaCl (0.12 g); RHOPLEX™ 2020E Thickener (0.6 g, A Trademark of The Dow Chemical Company or Its Affiliates); and $NaNO_2$ (0.2 g, 10% aq. solution).

Paint coatings were applied to 17.8-cm×10.15-cm mild steel substrates (Reliance metal and Aluminium Co, USA) using a 3-mil bar applicator (BYK-Gardner) and dried for 72 h under ambient conditions. Subsequently, the dried coatings were immersed into a corrosion solution, (0.1 M HCl+0.1 M NaCl) for 1 h under a continuous flow of oxygen. The coated substrates were removed from the corrosion solution and dried for 12 h under ambient conditions. The cycle of immersing the substrates in the corrosion solution (1 h) followed by drying under ambient conditions (12 h) was repeated for 9 more cycles. A small portion of the coating was removed using acetone and cotton and the extent of underlayer corrosion was observed by counting the number of corrosion spots present on the mild steel substrate as well as spreading of corrosion along the scribe.

Whereas complete undercoating corrosion and corrosion spreading along the scribe was observed for TEA-treated R706 $TiO_2$ particles, and nearly complete corrosion was observed for unmodified R706 $TiO_2$ (Native R706), only 2.6 corrosion spots/$cm^2$ were observed for the paint formulation prepared using the Example 1 hydrophobically modified $TiO_2$, and only 1.5 corrosion spots/$cm^2$ were observed for the paint formulation prepared using the Example 2 hydrophobically modified $TiO_2$, however, corrosion spreading along the scribe was less pronounced for the paint formulation from Example 1. Table 1 correlates a corrosion rating number with observed corrosion spots, and Table 2 correlates the corrosion rating with corrosion observed for paints prepared using Native R706 and the hydrophobically modified $TiO_2$ from Examples 1 and 2.

TABLE 1

Corrosion Rating

| Rating | Corrosion Spots/$cm^2$ |
|---|---|
| 0 | Complete corrosion |
| 1 | >15-40 |
| 2 | >7.5-15 |
| 3 | >3-7.5 |
| 4 | >0.75-3 |
| 5 | 0-0.75 |

TABLE 2

Corrosion of Paints using Unmodified $TiO_2$ versus Modified $TiO_2$

| Example | Rating |
|---|---|
| Native R706 | 0 |
| 1 | 4 |
| 2 | 4 |

The results show a dramatic improvement in corrosion resistance when using paints containing the hydrophobically modified $TiO_2$.

Example 3—Hydrophobic Modification of $TiO_2$ with a 74:25:1 Mixture of Methyltrihydroxysilane: Dimethyldihydroxysilane:3,3,3-Trifluoropropylsilanetriol The procedure was carried out substantially as described in Example 1 except that an admixture of MTHS, K-DMDS, and 3,3,3-Trifluoropropylsilanetriol (TFPST) were prepared by combining the aqueous solution of K-DMDS (0.20 g dissolved in 0.61 mL water), a portion of the MTHS solution as prepared in Intermediate Example 1 (1.81 mL), and trimethoxy(3,3,3-trifluoropropyl)silane (TMTFS, 12 µL) were admixed to form a 72:25:3 mole:mole:mole mixture of MTHS:K-DMDS:FEST. (Complete hydrolysis of the TMTFS to FEST was confirmed by ATR-FTIR spectroscopy.) The hydrophobicity of the resultant modified $TiO_2$ was confirmed as described hereinabove.

Paint formulations were prepared by combining the acrylic binder (12.79 g, 40.2 weight percent solids); DI water (1.97 g); Example 1 or Example 3 hydrophobically modified pigment (4.64 g, 75 wt. % pigment); and RHOPLEX™ 2020E Thickener (0.6 g). Coatings were applied to an acrylic substrate and dried for 48 h prior to stain testing. Tea, coffee, red wine, and ketchup were selected for stain testing. The stain testing procedure was carried out by first applying a staining material to a coated surface by soaking a 1-cm×1-cm paper towel with the staining material for 15 min, then placing the soaked towel on the coated surface for 2 h. The towel was removed and the stains were rinsed with water, followed by mild scrubbing with cotton and 1% detergent solution. Table 3 illustrates the correlation between stain rating number and qualitative appearance of the residual stain after washing.

TABLE 3

Stain Removal Rating

| Rating | Qualitative Stain Removal Performance |
|---|---|
| 0 | No stain removal, very strong visible trace |
| 1 | Very poor stain removal, strong visible trace |
| 2 | Poor stain removal, visible trace |
| 3 | Good stain removal, light trace |
| 4 | Very good stain removal, minimal trace |
| 5 | Excellent stain removal, no visible trace |

Table 4 illustrates the Stain rating results for the various paints: paint with unmodified $TiO_2$ (Native R-706); paint with $TiO_2$ modified as described in Example 1 (Example 1 $TiO_2$); and paint with $TiO_2$ modified as described in Example 3 (Example 3 $TiO_2$).

TABLE 4

| Stain Rating for Paints with Modified and Unmodified TiO$_2$ ||||
| --- | --- | --- | --- |
| Stain | Native R-706 | Example 1 TiO$_2$ | Example 3 TiO$_2$ |
| Tea | 1 | 5 | 5 |
| Coffee | 1 | 3 | 4 |
| Red Wine | 1 | 5 | 3 |
| Ketchup | 3 | 5 | 5 |

The results show that the paints with hydrophobically modified TiO$_2$ exhibit superior resistance to stain as compared to the paint containing the unmodified TiO$_2$.

The invention claimed is:

1. A composition comprising an aqueous dispersion of metal oxide pigment particles coated with an organosilane polymer comprising structural units of a) an alkyltrihydroxysilane or a salt thereof at a concentration in the range of from 50 to 98.9 mole percent; b) a dialkyldihydroxysilane or a salt thereof at a concentration in the range of from 1 to 49.9 mole percent; and c) an ancillary alkysilanetriol at a concentration in the range of from 0.1 to 4 mole percent; wherein all concentrations are based on the total structural units of the alkyltrihydroxysilane monomer, the dialkyldihydroxysilane monomer, and the ancillary alkylsilanetriol; wherein the ancillary alkylsilanetriol is 3-aminopropylsilanetriol or a salt thereof or 3,3,3-trifluoropropylsilanetriol or a salt thereof; and wherein the aqueous dispersion has a pH in the range of from 7.5 to 12.

2. The composition of claim 1 wherein the metal oxide pigment particles are CaCO$_3$, Al$_2$O$_3$, SiO$_2$, or TiO$_2$ pigment particles or combinations thereof; wherein the concentration of structural units of the alkyltrihydroxysilane or a salt thereof is in the range of from 60 to 90 mole percent; the concentration of structural units of the dialkyldihydroxysilane or a salt thereof is in the range of from 10 to 40 mole percent; and the concentration of structural units of the ancillary alkylsilanetriol or a salt thereof is in the range of from 0.2 to 3.5 mole percent.

3. The composition of claim 2 wherein the metal oxide pigment particles are TiO$_2$ pigment particles; wherein the concentration of structural units of the alkyltrihydroxysilane or a salt thereof is in the range of from 65 to 85 mole percent; the concentration of structural units of the dialkyldihydroxysilane or a salt thereof is in the range of from 15 to 30 mole percent; and the concentration of structural units of the ancillary alkylsilanetriol or a salt thereof is in the range of from 0.5 to 3.2 mole percent.

4. The composition of claim 1 wherein the ancillary alkylsilane triol is 3-aminopropylsilanetriol; the alkyltrihydroxysilane is methyltrihydroxysilane; and the dialkyldihydroxysilane is dimethyldihydroxysilane.

5. The composition of claim 1 wherein the ancillary alkylsilane triol is 3,3,3-trifluoropropylsilanetriol; the alkyltrihydroxysilane is methyltrihydroxysilane; and the dialkyldihydroxysilane is dimethyldihydroxysilane.

6. The composition of claim 3 which comprises less than 0.09 weight percent of a dispersing agent, based on the weight of the TiO$_2$ particles.

7. The composition of claim 6 which comprises less than 0.01 weight percent of a dispersing agent, based on the weight of the TiO$_2$ particles.

8. The composition of claim 1 which further includes a latex, a thickener, and one or more materials selected from the group consisting of defoamers, surfactants, extenders, coalescents, biocides, and colorants.

* * * * *